United States Patent
Ichihara et al.

(10) Patent No.: US 11,449,405 B2
(45) Date of Patent: Sep. 20, 2022

(54) INFORMATION PROCESSING APPARATUS, CONTROL METHOD, AND PROGRAM

(71) Applicant: NEC CORPORATION, Tokyo (JP)

(72) Inventors: Etsuko Ichihara, Tokyo (JP); Yoshiaki Sakae, Tokyo (JP); Kazuhiko Isoyama, Tokyo (JP); Jun Nishioka, Tokyo (JP)

(73) Assignee: NEC CORPORATION, Tokyo (JP)

(*) Notice: Subject to any disclaimer, the term of this patent is extended or adjusted under 35 U.S.C. 154(b) by 178 days.

(21) Appl. No.: 17/041,584

(22) PCT Filed: Mar. 28, 2018

(86) PCT No.: PCT/JP2018/012786
§ 371 (c)(1),
(2) Date: Sep. 25, 2020

(87) PCT Pub. No.: WO2019/186777
PCT Pub. Date: Oct. 3, 2019

(65) Prior Publication Data
US 2021/0034488 A1    Feb. 4, 2021

(51) Int. Cl.
*G06F 11/30* (2006.01)
*G06F 16/901* (2019.01)
(Continued)

(52) U.S. Cl.
CPC .......... *G06F 11/302* (2013.01); *G06F 11/323* (2013.01); *G06F 16/9024* (2019.01);
(Continued)

(58) Field of Classification Search
None
See application file for complete search history.

(56) References Cited

U.S. PATENT DOCUMENTS

2017/0075746 A1* 3/2017 Nomura .............. G06F 11/0721
2019/0138542 A1* 5/2019 Van Beest ............ G06F 21/552

FOREIGN PATENT DOCUMENTS

JP         10-31615 A    2/1998
JP      2003-216454 A    7/2003
(Continued)

OTHER PUBLICATIONS

Kazuyuki Iso et al., "Idea creation systems flexibly adapting to user's situations", IEICE Technical Report, Mar. 10, 2000, pp. 101-106, vol. 2000 No. 26.

(Continued)

*Primary Examiner* — Jennifer Mehmood
*Assistant Examiner* — Jed-Justin Imperial
(74) *Attorney, Agent, or Firm* — Sughrue Mion, PLLC

(57) ABSTRACT

An information processing apparatus generates a graph that represents an action of a program. On the graph, an edge represents action contents of a process in an event. Further, two nodes connected by the edge respectively represent a subject and an object of the event. The information processing apparatus outputs the generated graph. Further, the information processing apparatus also alters the generated graph. When an index value of an event satisfies a first predetermined condition which index value is based on the number of occurrences or the frequency of occurrences of the event, the information processing apparatus alters the graph with respect to an edge representing the event.

7 Claims, 11 Drawing Sheets

(51) Int. Cl.
  *G06F 11/32* (2006.01)
  *G06F 21/56* (2013.01)
  *G06T 11/20* (2006.01)
(52) U.S. Cl.
  CPC .......... *G06F 21/566* (2013.01); *G06T 11/206* (2013.01); *G06F 2221/034* (2013.01)

(56) References Cited

FOREIGN PATENT DOCUMENTS

| | | |
|---|---|---|
| JP | 2016-528656 A | 9/2016 |
| JP | 2017-107282 A | 6/2017 |
| JP | 2017-107330 A | 6/2017 |
| WO | 2015/140842 A1 | 9/2015 |

OTHER PUBLICATIONS

International Search Report for PCT/JP2018/012786, dated Jun. 26, 2018.

\* cited by examiner

FIG. 6

| SUBJECT INFORMATION | | OBJECT INFORMATION | | CONTENTS INFORMATION | TIMES OF OCCURRENCES |
|---|---|---|---|---|---|
| PROCESS NAMES | PATHS | TYPES | IDENTIFICATION INFORMATION | | |
| process A | C¥dir11/dir12/a1.exe | PROCESS | D¥dir21/dir22/a2.exe | START | 1/10/2018 10:05:24 |
| process B | C¥dir13/dir14/b1.exe | FILE | D¥dir23/b2.conf | WRITE | 1/10/2018 10:06:02 |
| process C | C¥dir15/dir16/c1.exe | SOCKET | socket1 | READ | 1/11/2018 9:06:02 |
| ... | ... | ... | ... | ... | ... |

SOCKET s1 AND SOCKET s2 ARE CONNECTED COMMUNICABLY

COUPLE TWO GRAPHS TOGETHER

EXPAND OMITTED PART

CONSOLIDATE AGAIN

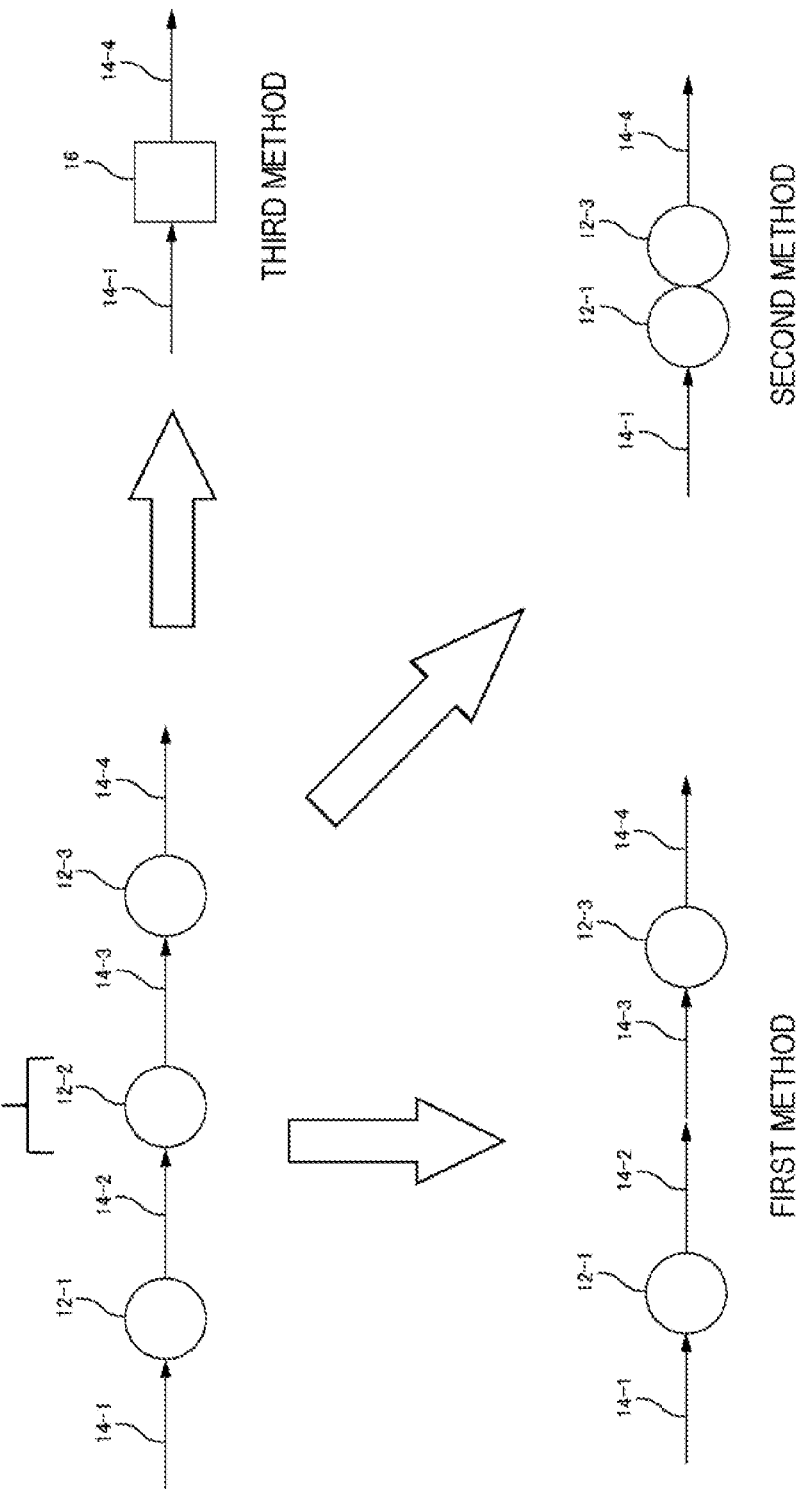

INFORMATION PROCESSING APPARATUS, CONTROL METHOD, AND PROGRAM

CROSS REFERENCE TO RELATED APPLICATIONS

This application is a National Stage of International Application No. PCT/JP2018/012786 filed Mar. 28, 2018.

TECHNICAL FIELD

The present invention relates to a technique for recognizing an action of a program.

BACKGROUND ART

To recognize an action of a program operating on a computer, a technique has been developed for presenting the action of a program as a graph. The graph here means a data structure consisting of a set of nodes and a set of edges interconnecting the nodes.

Prior art documents disclosing a technique for presenting an action of a program as a graph include, for example, PTL 1. PTL 1 discloses a technique for generating an event-correlation graph including an edge that represents a suspicious event and nodes that represent a subject and an object of the suspicious event in order to detect an attack on a computer system. More specifically, a suspiciousness score is defined based on an attribute of the suspicious event, and an attack is detected by computing an attack score from the suspiciousness scores of the edge and the nodes constituting the event-correlation graph. As a method of computing the attack score, a method of computing the attack score based on a size of the event-correlation graph is disclosed. PTL 1 further discloses displaying the generated event-correlation graph to an administrator.

CITATION LIST

Patent Literature

[PTL 1] Japanese Patent Application Publication (Translation of PCT Application) No. 2016-528656.

SUMMARY OF INVENTION

Technical Problem

Various programs can perform various actions on a system. Therefore, representing all of the actions performed by the programs will increase the number of nodes and edges and therefore increase a computer resource consumed for outputting the graph.

In this regard, PTL 1 discloses that, when the attack score is computed based on the size of the event-correlation graph, a node and an edge having low suspiciousness scores may be removed from the event-correlation graph before the computation of the attack score. However, PTL 1 does not disclose removing a node or an edge based on any index other than suspiciousness score. Further, PTL 1 does not disclose removing some of the nodes and the edges as described above with respect to the event-correlation graph to be displayed to the administrator.

The present invention has been made in view of the above-described problem, and one of objects of the present invention is to provide a technique for appropriately reducing an amount of a computer resource required for outputting a graph representing an action of a program.

Solution to Problem

An information processing apparatus according to the present invention includes (1) a generation unit that generates a graph that represents action contents in an event relating to an action of a program as an edge and represents a subject and an object of the event as respective nodes, (2) an output unit that outputs the generated graph, (3) a first alteration unit that alters the graph with respect to an edge representing the event when an index value of the event satisfies a first predetermined condition, which index value is based on a number of occurrences or a frequency of occurrences of the event, and (4) a second alteration unit that executes at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge. The output unit outputs the graph altered by the first alteration unit or the second alteration unit.

A control method according to the present invention is a control method that is executed by a computer. The control method includes (1) a generation step of generating a graph that represents action contents in an event relating to an action of a program as an edge and represents a subject and an object of the event as respective nodes, (2) an output step of outputting the generated graph, (3) a first alteration step of altering the graph with respect to an edge representing the event when an index value of the event satisfies a first predetermined condition, which index value is based on a number of occurrences or a frequency of occurrences of the event, and (4) a second alteration step of executing at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge. The graph altered at the first alteration step or the second alteration step is outputted at the output step.

A program according to the present invention causes a computer to execute each of the steps included in a control method according to the present invention.

Advantageous Effects of Invention

According to the present invention, a technique for appropriately reducing an amount of a computer resource required for outputting a graph representing an action of a program is provided.

BRIEF DESCRIPTION OF DRAWINGS

The above-described object and other objects, characteristics, and advantages will be made even more apparent by the preferable example embodiments described below and the attached drawings below.

FIG. 6 is a diagram illustrating event information in tabular form.

FIG. 11 is a diagram illustrating a method of removing a node from a graph.

EXAMPLE EMBODIMENT

Example embodiments of the present invention will be described below with reference to the drawings. Note that, throughout the drawings, like constituent elements are denoted by like reference signs and will not be described in details where appropriate. Unless otherwise mentioned, the blocks in the block diagrams represent functional components, not hardware components.

Example Embodiment 1

Outline

First of all, an operation of an information processing apparatus according to the present example embodiment (the information processing apparatus 2000 in FIG. 2) will be outlined. What will be described here is a conceptual description for facilitating the understanding of an operation of the information processing apparatus 2000 and does not limit the operation of the information processing apparatus in any specific way.

Figure 1:
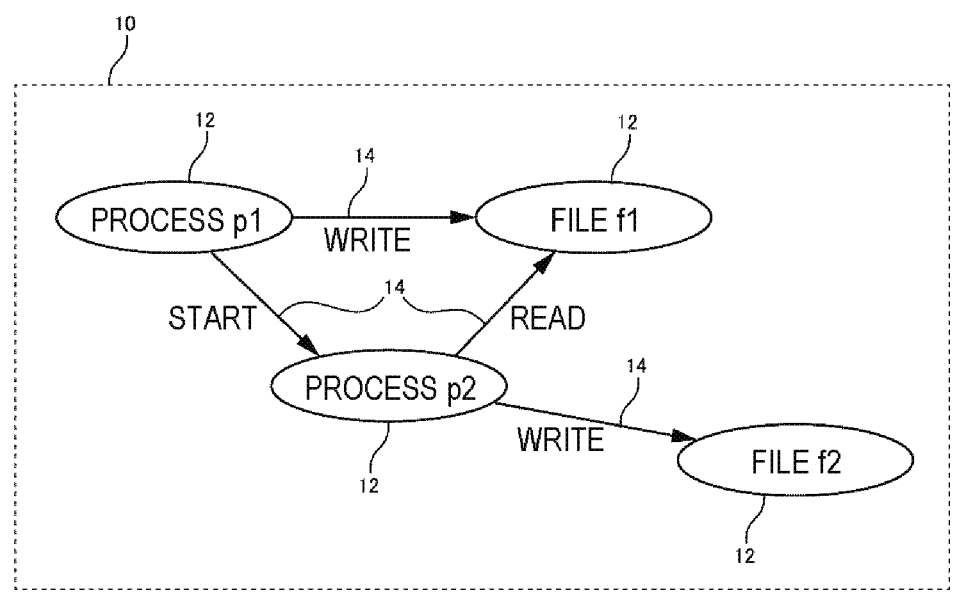
FIG. 1 is a diagram illustrating a graph generated by an information processing apparatus.

The information processing apparatus 2000 generates a graph 10 that represent an action of a program in a target apparatus. FIG. 1 is a diagram illustrating a graph 10 generated by an information processing apparatus 2000. The graph 10 is a data structure consisting of a set of nodes 12 and a set of edges 14 interconnecting the nodes 12. In the graph 10, an event is represented by an edge 14 and two nodes 12 interconnected by the edge 14.

An event is an action applied to an object by a process (a program being executed). An edge 14 represents the action contents of a process in the event. The two nodes 12 interconnected by the edge 14 respectively represent the subject and the object of the event. The subject of an event is a process. The object of an event is a process, a file, or the like. For example, an event caused by a process may be a starting of another process, a communication with another process, an access to a file, or the like.

Note that in FIG. 1 the graph 10 is illustrated as a directed graph in which the edges 14 have directions. When the graph 10 is a directed graph like this, the node 12 connected to the starting point of an edge 14 represents the subject of the event and the node 12 connected to the final point of the edge 14 represents the object of the event. However, the graph 10 does not need to be a directed graph but may be an undirected graph.

The information processing apparatus 2000 outputs the generated graph 10. For example, the graph 10 is used by a user who monitors the target apparatus. The user recognizes the situation of the target apparatus by viewing the graph 10. More specifically, by viewing the graph 10, the user checks whether an event indicating an abnormal state in the target apparatus has occurred. An event indicating an abnormal state is, for example, an event in which malware is involved. Note, however, that the term "abnormal" is not limited to the abnormality relating to security. For example, an unexpected operation by a process due to a bug in the program is also treated as abnormal.

Further, the information processing apparatus 2000 also alters the generated graph 10. Specifically, when an index value of an event satisfies a first predetermined condition, which index value is based on the number of occurrences or frequency of occurrences of an event, the information processing apparatus 2000 alters the graph 10 with respect to the edge 14 representing the event. Hereinafter, the "index value of the event which index value is based on the number of occurrences or the frequency of occurrences of an event" will be referred to as the event occurrence index value.

Conceptually, with respect to an event with a large number of occurrences or an event with a high frequency of occurrences, the information processing apparatus 2000 operates in such a way as to exclude from the graph 10 the nodes 12 connected to the edge 14 representing the event. The event occurrence index value is used as an index to enable this operation.

As the events representing abnormal states occur less frequently than the events representing normal states, it can be assumed that the number of occurrences and frequency of occurrences of the former are small. In other words, the number of occurrences and the frequency of occurrences of the events representing normal states are great. Thus, the information processing apparatus 2000 removes from the graph 10 the information on the events of which the number of occurrences and the frequency of occurrences are relatively large (in other words, events representing normal states) and thereby enables the user of the graph 10 to concentrate on the events that may be representing abnormal states. Therefore, the information processing apparatus 2000 has an advantageous effect of increasing the usefulness of the graph 10 for the user.

Further, as the information processing apparatus 2000 can reduce the information on the events representing normal states from the graph 10, the information processing apparatus 2000 has an advantageous effect of reducing the computer resource required for outputting the graph 10 while increasing the usefulness of the graph 10 for the user as described above. For example, as the numbers of the nodes 12 and edges 14 included in the graph 10 are reduced, the screen data representing the graph 10 will be simplified. This enables the reduction of the processor resource required for generating the screen data representing the graph 10 and the reduction of the display region on the display device required for displaying the screen data. Further, as the numbers of the nodes 12 and edges 14 included in the graph 10 are reduced, the data size of the information representing the graph 10 will be reduced. This enables the reduction of the memory region required for storing the information representing the graph 10. Further, this enables the reduction of the network band required for a transmission of the information representing the graph 10 from the information processing apparatus 2000 to another apparatus.

Further, the information processing apparatus 2000 execute at least one of (1) a process for altering the graph 10 with respect to a node when an index value of the node satisfies a second predetermined condition, which index value is based on a history of operations applied to the node and (2) a process for altering the graph 10 with respect to an edge when an index value of the edge satisfies a third predetermined condition, which index value is based on a history of operations applied to the edge. Hereinafter, an "index value of the node which index value is based on a history of operations applied to the node" will be referred to as a node operation index value and an "index value of the edge which index value is based on a history of operations applied to the edge" will be referred to as an edge operation index value.

Conceptually, the information processing apparatus 2000 operates in such a way as to exclude (1) such a node 12 that the number of times or frequency of operations applied thereto is small or (2) such an edge 14 that the number of times of operations or the frequency of operations applied thereto is small. The node operation index value and the edge operation index value are index values for realizing the operations (1) and (2), respectively.

It can be assumed that an event represented by nodes 12 and edges 14 with a small number of times of operations or a low frequency of operations is an event in which the user is interested to a small extent. For example, when the user recognizes the state of the target apparatus by viewing the graph 10 as described above, it can be assumed that the user pays attention to nodes 12 and edges 14 representing an event highly likely to be representing an abnormal state and tends to apply an operation to these nodes and edges. Thus, by reducing from the graph 10 the information on an event represented by nodes 12 and edges 14 with a small number of times of operations or a low frequency of operations, the information processing apparatus 2000 allows the user to concentrate on events in which he/she is interested to a greater extent. Therefore, the information processing apparatus 2000 has an advantageous effect of increasing the usefulness of the graph 10 for the user.

Further, the removal of the information on the event in which the user is interested to a small extent from the graph 10 also has an advantageous effect of reducing the computer resource required for outputting the graph 10 while increasing the usefulness of the graph 10.

Note that the above-described reduction of the computer resource becomes more evident as the number of times the graph 10 is outputted increases. When a plurality of users views the graph 10 on different terminals, the information processing apparatus 2000, for example, transmits the graph 10 to each terminal. In such a case, the size reduction of the graph 10 produces a great reduction effect on the usage volume of the network band. Further, the reduction effect for the system as a whole is great, for the reductions in the use of processor resource and in the display region of the display apparatus are realized in each terminal.

The information processing apparatus 2000 according to the present example embodiment will be described below in further details.

An Example of a Functional Configuration of the Information Processing Apparatus 2000

Figure 2:
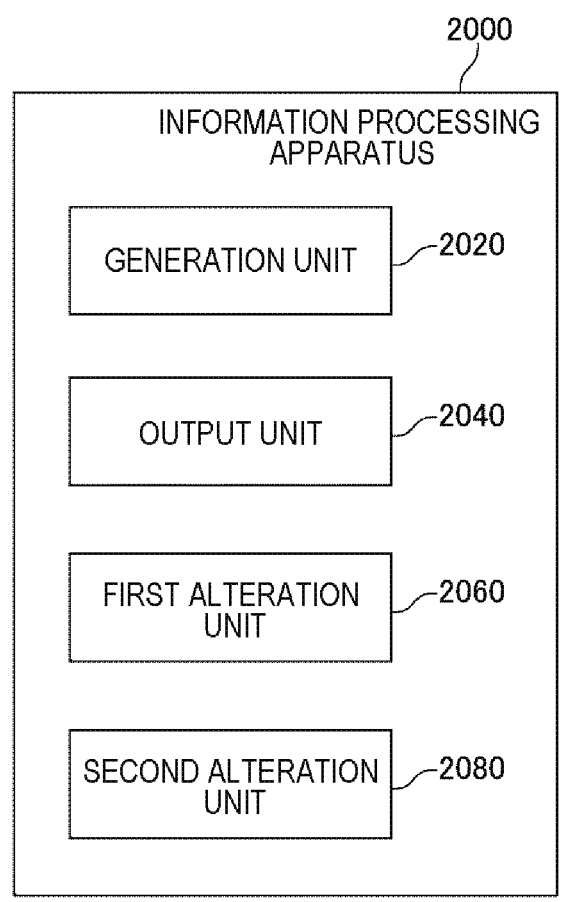
FIG. 2 is a diagram illustrating a configuration of an information processing apparatus according to Example Embodiment 1.

FIG. 2 is a diagram illustrating a configuration of an information processing apparatus 2000 according to Example Embodiment 1. The information processing apparatus 2000 includes a generation unit 2020, a first alteration unit 2060, a second alteration unit 2080, and an output unit 2040. The generation unit 2020 generates a graph 10 with respect to a target apparatus. The output unit 2040 outputs the graph 10. When the event occurrence index value of an event satisfies a first predetermined condition, the first alteration unit 2060 alters the graph 10 with respect to the edge 14 representing the event. The second alteration unit 2080 executes at least one of (1) a process of altering the graph 10 with respect to a node 12 when the node operation index value of the node 12 satisfies a second predetermined condition, and (2) a process of altering the graph 10 with respect to an edge 14 when the edge operation index value of the edge 14 satisfies a third predetermined condition. The output unit 2040 outputs the graph 10 altered by the first alteration unit 2060 or the second alteration unit 2080.

Hardware Configuration of the Information Processing Apparatus 2000

The functional component units of the information processing apparatus 2000 may be realized by hardware for realizing functional component units (e.g., hardwired electronic circuits or the like) or may be realized by a combination of hardware and software (e.g., a combination of an electronic circuit and a program to control the circuit). A case in which the functional components of the information processing apparatus 2000 are realized by a combination of hardware and software will be further described below.

Figure 3:
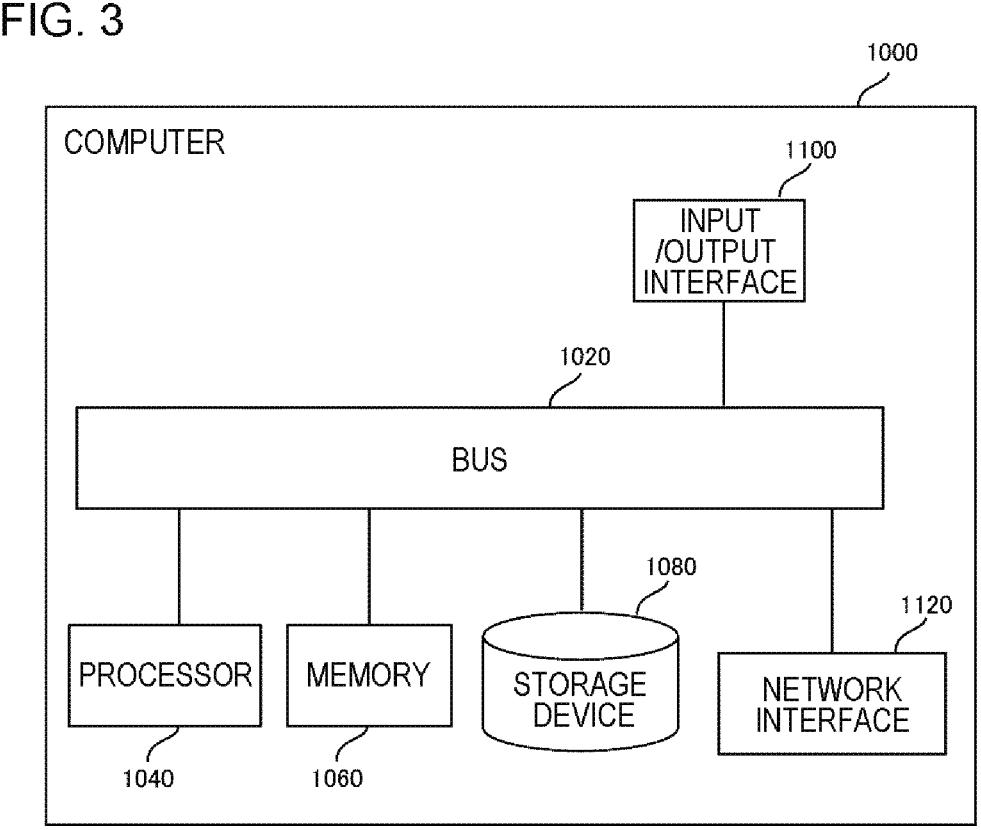
FIG. 3 is a diagram illustrating a computer for realizing an information processing apparatus.

FIG. 3 is a diagram illustrating a computer 1000 for realizing an information processing apparatus 2000. The computer 1000 may be any computer. For example, the computer 1000 may be a personal computer (PC), a server machine, a tablet terminal, a smart phone, or the like. The computer 1000 may be a dedicated computer designed for realizing the information processing apparatus 2000 or may be a general-purpose computer.

The computer 1000 includes a bus 1020, a processor 1040, a memory 1060, a storage device 1080, an input/output interface 1100, and a network interface 1120. The bus 1020 is a data transmission path for mutual data transmission/reception among the processor 1040, the memory 1060, the storage device 1080, the input/output interface 1100, and the network interface 1120. Note, however, that the method of mutual connection among the processor 1040 and the like is not limited to the bus connection. The processor 1040 is a processor such as a central processing unit (CPU), a graphics processing unit (GPU), or a field-programmable gate array (FPGA). The memory 1060 is a main storage constituted by random access memory (RAM) or the like. The storage device 1080 is an auxiliary storage constituted by a hard disc drive, a solid state drive (SSD), a memory card, read only memory (ROM), or the like. Note, however, that the storage device 1080 may be constituted by a piece of hardware, such as RAM, similar to the piece of hardware constituting the main storage.

The input/output interface 1100 is an interface for connecting the computer 1000 and the input/output device. The network interface 1120 is an interface for connecting the computer 1000 to a communication network. This communication network is, for example, a local area network (LAN) or a wide area network (WAN). The method of connection between the network interface 1120 and the communication network may be wireless connection or wired connection.

The storage device 1080 stores program modules for realizing the functional component units of the information processing apparatus 2000. The processor 1040 reads these program modules onto the memory 1060 and thereby realizes the functions corresponding to the program modules.

On the Target Apparatus

The target apparatus may be any computer such a PC, a server machine, a tablet terminal, or a smart phone. The target apparatus is not limited to a physical machine but may be a virtual machine.

There may be one target apparatus or may be a plurality of target apparatuses. For example, the information processing apparatus 2000 generates respective graphs 10 with respect to a plurality of target apparatuses. Note, however, that, when a plurality of target apparatuses are in communication with each other, the information processing apparatus 2000 may generate one graph 10 for the plurality of target apparatuses by coupling together the graphs 10 respectively generated with respect to the target apparatuses, as will be described later.

Procedure of Processing

Figure 4:
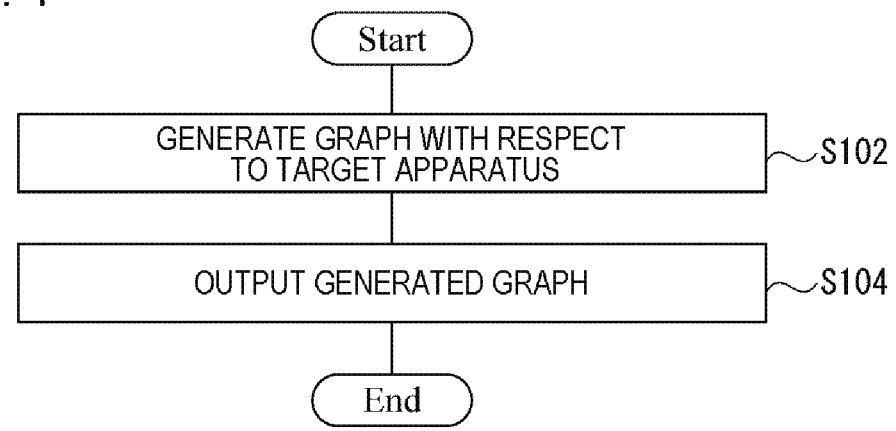
FIG. 4 is a flow chart illustrating a procedure of the processing executed by the information processing apparatus according to Example Embodiment 1.
Figure 5:
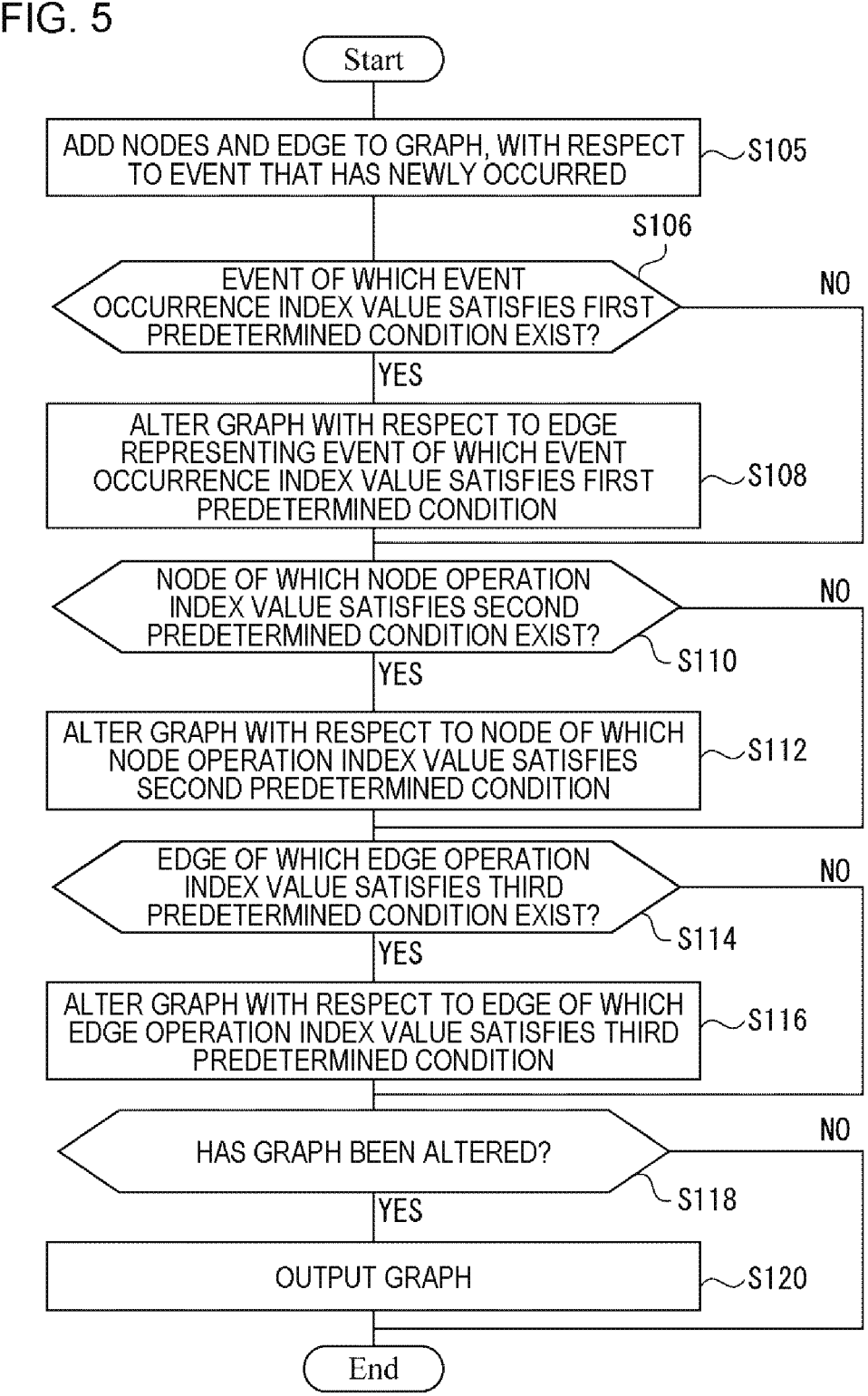
FIG. 5 is a flow chart illustrating a procedure of the processing executed by the information processing apparatus according to Example Embodiment 1.

FIG. 4 and FIG. 5 are flow charts illustrating a procedure of the processing executed by the information processing apparatus 2000 according to Example Embodiment 1. The flow chart of FIG. 4 illustrates a procedure of the processing of generating a graph 10. The flow chart of FIG. 5 illustrates a procedure of the processing for altering the graph 10.

Flow Chart of FIG. 4

The generation unit 2020 generates a graph 10 with respect to the target apparatus (S102). The output unit 2040 outputs the graph 10 (S104).

Flow Chart of FIG. 5

The generation unit 2020 adds nodes 12 and an edge 14 with respect to an event that has newly occurred to the graph 10 (S105). The first alteration unit 2060 determines whether an event of which the event occurrence index value satisfies the first predetermined condition exists (S106). When an event of which the event occurrence index value satisfies the first predetermined condition exists (S106: YES), the first alteration unit 2060 alters the graph 10 with respect to the edge 14 representing the event (S108). When no event of which the event occurrence index value satisfies the first predetermined condition exists (S106: NO), the next step of the processing in FIG. 5 is S110.

The second alteration unit 2080 determines whether a node 12 of which the node operation index value satisfies the second predetermined condition exists (S110). When a node 12 of which the node operation index value satisfies the second predetermined condition exists (S110: YES), the second alteration unit 2080 alters the graph 10 with respect to the node 12 (S112). When no node 12 of which the node operation index value satisfies the second predetermined condition exists (S110: NO), the next step of the processing in FIG. 5 is S114.

The second alteration unit 2080 determines whether an edge 14 of which the edge operation index value satisfies the third predetermined condition exists (S114). When an edge 14 of which the edge operation index value satisfies the third predetermined condition exists (S114: YES), the second alteration unit 2080 alters the graph 10 with respect to the edge 14 (S116). When no edge 14 of which the edge operation index value satisfies the third predetermined condition exists (S116: NO), the next step of the processing in FIG. 5 is S118.

The output unit 2040 determines whether the graph 10 has been altered (S118). When the graph 10 has been altered (S118: YES), the output unit 2040 outputs the altered graph 10 (S120). When the graph 10 has not been altered (S118: NO), the processing in FIG. 5 ends.

The procedure of the processing executed by the information processing apparatus 2000 is not limited to the one illustrated in FIG. 5. For example, in the lower part of the flow chart, the process with respect to the first predetermined condition, the process with respect to the second predetermined condition, and the process with respect to the third predetermined condition are executed in this order, but these may be arranged in any order. Further, these processes do not need to be executed consecutively but may be executed concurrently. Further, the information processing apparatus 2000 does not need to be configured in such a way as to execute both the process with respect to the second predetermined condition and the process with respect to the third predetermined condition but the information processing apparatus 2000 may be configured in such a way as to execute only one of these.

There are various opportunities for the information processing apparatus 2000 to execute the processing for generating a graph 10 (as illustrated by the flow chart of FIG. 4). For example, the information processing apparatus 2000 receives an input representing an instruction to generate a graph 10 with respect to the target apparatus. The information processing apparatus 2000 generates and outputs a graph 10 in response to this input. Further, for example, the information processing apparatus 2000 may determine whether there is a target apparatus for which no graph 10 has been generated among the target apparatuses for which a graph 10 can be generated (for example, apparatuses connected to the information processing apparatus 2000 via a LAN) and, when there is a target apparatus for which no graph 10 has been generated, the information processing apparatus 2000 may automatically generate a graph 10 with respect to that target apparatus.

After a graph 10 has been generated with respect to the target apparatus, the processing for trying to alter the graph 10 with respect to the target apparatus is executed (as illustrated in the flow chart of FIG. 5). There are various opportunities for the information processing apparatus 2000 to execute the processing for trying to alter the graph 10. For example, the information processing apparatus 2000 tries to alter the graph 10 regularly. Further, for example, when the user performs an operation to have the generated graph 10 outputted, the information processing apparatus 2000 tries to alter the graph 10 before outputting the graph 10. In this case, the information processing apparatus 2000 outputs the graph 10 even when the graph 10 has not been altered (no need for S118 of FIG. 5). In this case, when the graph 10 has not been altered, the unaltered graph 10 will be outputted and, when the graph 10 has been altered, the altered graph 10 will be outputted.

On Events

As described above, an event is an action applied to an object by a process. When a process is an action applied to another process as an object, these processes may be operating on the same operating system (OS) as each other or may be operating on different OSs from each other. As an example for the latter case, for example, it is conceivable that a process carries out communication with another process operating on a different OS by using a socket interface.

For example, an event is identified by information representing four elements, namely, subject, object, action contents, and time of occurrence. For example, the information representing the subject (hereinafter referred to as subject information) is the information that identifies the process that caused the event. Hereinafter, the information that identifies a process will be referred to as process identification information. Process identification information represents, for example, a name of a process. Further, for example, process identification information is the name or path of an executable file of a program or the process identifier (ID) relating to the process. Note that process identification information may be a combination of a plurality of identifiers such as a combination of the path of an executable file and a process ID.

The information representing an object (hereinafter referred to as object information) is, for example, the type and identification information of the object. The type of an object is, for example, process, file, socket, or the like. When the object is a process, the object information includes the process identification information of the process.

When the object is a file, the object information includes information that identifies the file (hereinafter referred to as file identification information). File identification information is, for example, the name or path of the file. Further, when the object is a file, the object information may include a hash value of the file.

When the object is a socket, the object information includes, for example, an identifier assigned to the socket.

Information representing action contents (hereinafter referred to as contents information) is, for example, one of identifiers assigned in advance to various action contents. For example, identifiers different from each other are assigned to various contents of actions such as "to start a process", "to stop a process", "to open a file", "to read data from a file", "to write data in a file", "to open a socket", "to read data from a socket", "to write data in a socket", and the like. Note that an access to a socket means an access to another apparatus associated with the socket.

To generate a graph 10, it is necessary to have information representing each of the events that occurred in the target apparatus. This information will be hereinafter referred to as event information. For example, event information indicates, with respect to each of the events that occurred in the target apparatus, a combination of subject information, object information, contents information, and time of occurrence.

FIG. 6 is a diagram illustrating event information in tabular form. The table in FIG. 6 will be hereinafter referred to as the table 200. The table 200 includes subject information 202, object information 204, contents information 206, and times of occurrences 207. The subject information 202 includes process names 208 and paths 210. The object information 204 includes types 212 and identification information 214. The times of occurrences 207 denote the times when the events occurred.

For example, event information can be generated by keeping a log of the information on each of the events that occurred in the target apparatus. Conventional techniques can be used for keeping a log of the information on the events that occurred.

Generation of a Graph 10: S102

The generation unit 2020 generates a graph 10 with respect to the target apparatus (S102). For this reason, the generation unit 2020 acquires the above-described event information. The generation unit 2020 generates a graph 10 using the event information.

The edges 14 and the nodes 12 of the graph 10 are determined based on event information. Specifically, contents information determines an edge 14, and subject information and object information respectively determine two nodes 12 interconnected by the edge 14. Here, conventional techniques can be used for generating a graph using the information that determines an edge and the nodes at both ends thereof.

In principle, when the object of an event and the subject of another event is the same entity, a graph 10 is generated in which the pieces of information on the plurality of events are coupled together by representing the object of the event and the subject of the other event by using the same node 12.

Note that the graph 10 is preferably generated taking the time of occurrence into consideration. For example, when the object of an event is the subject of another event, the time of occurrence of the former event is earlier than the time of occurrence of the latter event. Thus, the generation unit 2020 generates a graph 10 taking into consideration the order of the times of occurrences of the events.

On Cases in which a Plurality of Target Apparatuses Exist

When a plurality of target apparatuses exist, the generation unit 2020, for example, generates respective graphs 10 for the target apparatuses. Note, however, that, as described above, with respect to a plurality of target apparatuses in communication with each other, it is preferable to couple together the graphs 10 with respect to these target apparatuses.

The graphs 10 respectively generated with respect to the plurality of target apparatuses are coupled together, for example, via nodes 12 representing an event with respect to communication between the target apparatuses. The communication between the target apparatuses is carried out by, for example, using a socket interface. For example, the transmission of data from a target apparatus to the other target apparatus is realized by an action of writing in a socket or the like. On the other hand, the reception of data from the other target apparatus is realized by an action of reading from a socket.

Figure 7:
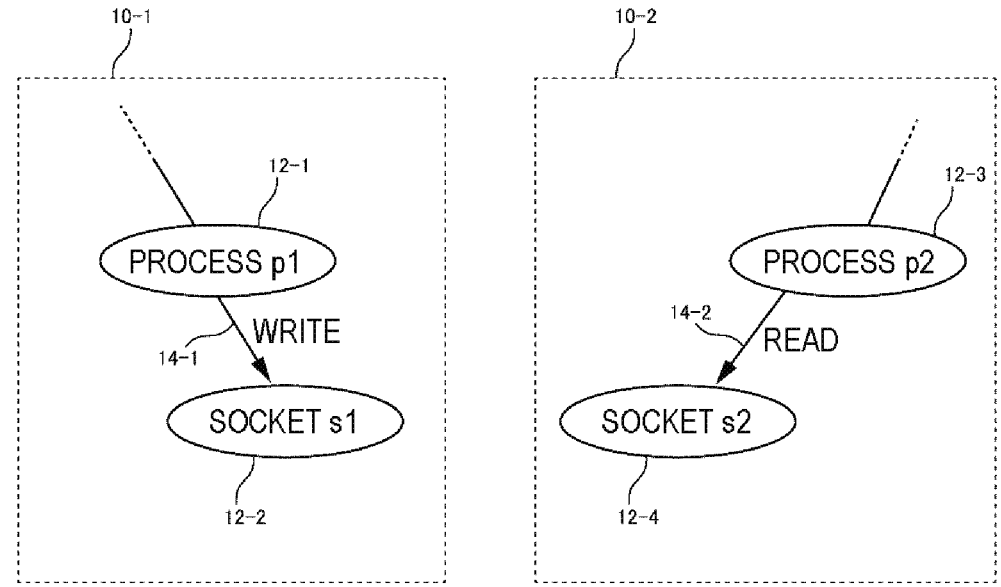
FIG. 7 is a diagram illustrating a method of generating one graph by coupling graphs generated with respect to target apparatuses different from each other.
Figure 7:
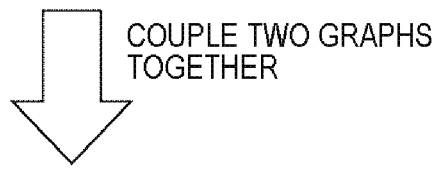
Figure 7:
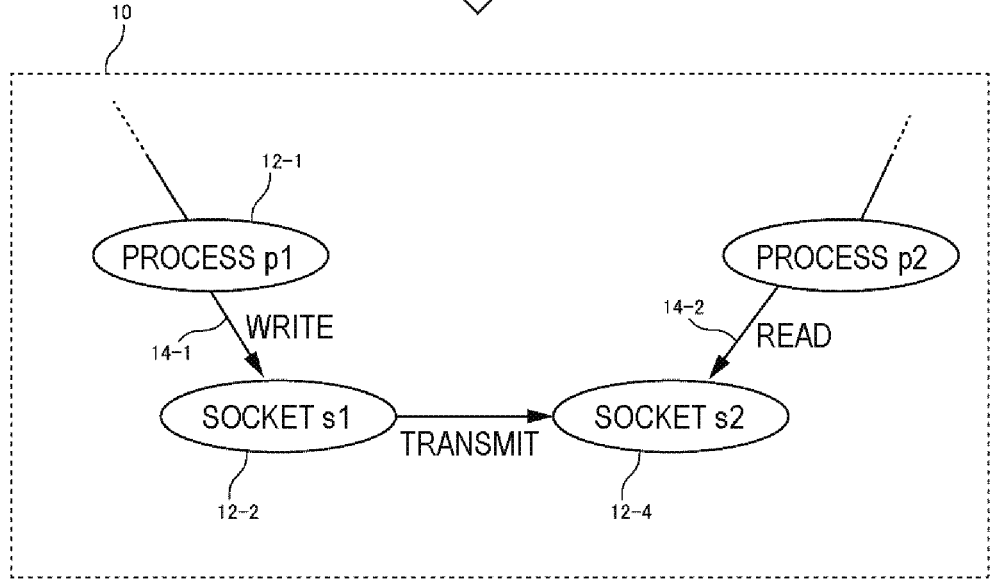

Thus, the generation unit 2020 couples together graphs 10 generated with respect to target apparatuses different from each other by, for example, matching the events of which the objects are the sockets, carried out in the target apparatuses different from each other. FIG. 7 is a diagram illustrating a method of generating one graph 10 by coupling together graphs generated with respect to target apparatuses different from each other.

In the upper part of FIG. 7, the graph 10-1 and the graph 10-2, generated respectively with respect to target apparatuses different from each other, are not coupled together. On the graph 10-1, the process P1 represented by the node 12-1 writes data in the socket S1 represented by the node 12-2. On the graph 10-2, the process P2 represented by the node 12-3 reads data from the socket S2 represented by the node 12-4.

It is assumed here that the socket S1 and the socket S2 are connected communicably (there is an established connection between them). It follows from this that the process P1 is transmitting data to the process P2 via the sockets S1 and S2.

Thus, the generation unit 2020 couples together the graph 10-1 and the graph 10-2 by coupling together the above-described sockets S1 and S2 and thereby generates one graph 10 (see the lower part of FIG. 7).

Note that it is possible to determine the sockets connected communicably with each other by, for example, matching the information that the sockets have about the network (the port number and the IP address of the communication target).

Adding an Event that has Newly Occurred: S105

When updating the graph 10, the generation unit 2020 adds nodes 12 and an edge 14 with respect to any event that has newly occurred to the graph 10 (S105). In other words, the generation unit 2020 incorporates into the graph 10 any event that is not yet represented on the graph 10. Note that an "event that has newly occurred" is an event that occurred after the graph 10 had been generated or updated last time. Here, the generation unit 2020 acquires event information with respect to any event that occurred after the graph 10 had been generated or updated last time and adds nodes 12 and an edge 14 to the graph 10, by using the event information.

On the Event Occurrence Index Value

An event occurrence index value is an index value defined based on the number of occurrences or the frequency of occurrences of an event. It is assumed here that an event occurrence index value of an event is defined based on the number of occurrences of the event. In this case, for example, the first alteration unit 2060 defines the event occurrence index value as such a value that is greater when the number of occurrences of the event is greater (in other words, as a value that has a positive correlation with the number of occurrences of the event). For example, the first alteration unit 2060 defines the event occurrence index value as the number of occurrences of the event itself. Further, for example, the first alteration unit 2060 may define the event occurrence index value as a value obtained by inputting the number of occurrences of the event to a discretionarily selected, predefined monotonically non-decreasing function. This monotonically non-decreasing function may be given in advance to the first alteration unit 2060 or may be stored in a storage device accessible from the first alteration unit 2060.

The event occurrence index value of an event is defined based on the frequency of occurrences of the event in a similar way. For example, the first alteration unit 2060 defines the event occurrence index value as such a value that is greater when the frequency of occurrences of the event is higher (in other words, as a value that has a positive correlation with the frequency of occurrences of the event). For example, the first alteration unit 2060 defines the event occurrence index value as the frequency of occurrences of the event itself. Further, for example, the first alteration unit 2060 may define the event occurrence index value as a value obtained by inputting the frequency of occurrences of the event to a discretionarily selected, predefined monotonically non-decreasing function. This monotonically non-decreasing function may be given in advance to the first alteration unit 2060 or may be stored in a storage device accessible from the first alteration unit 2060.

There are various ways to compute the frequency of occurrences of an event. For example, the frequency of occurrences of an event is computed based on the number of times the event occurred in a predetermined time window. The length of the time window may be selected freely. For example, the frequency of occurrences of an event with respect to the target apparatus is defined as the number of times the event occurred with respect to the target apparatus in the time window or as the value obtained by dividing the number of times by the length of the time window.

When there are a plurality of target apparatuses, the frequency of occurrences of an event may be computed using the equation (1) below.

[Equation 1]

$$F(e, w) = N(e, w)/Nall \quad (1)$$

where e and w represent the event and the time window, respectively. $F(e, w)$ is the frequency of occurrences of the event e in the time window w. $N(e, w)$ is the number of the target apparatuses with respect to which the event e occurred in the time window w. $Nall$ is the total number of the target apparatuses.

Note that, in computing the frequency of occurrences of an event according to the equation (1) above, events having the same subject, object, and action contents as each other are handled as the same event. A method of determining the sameness of these elements will be described below.

On the Sameness of Subjects

The first alteration unit 2060 determines whether the subjects of a plurality of events are the same as each other by comparing the pieces of subject information respectively included in the pieces of event information of the events. As described above, the subject of an event is represented by the process name of the process that caused the event, the name of an executable file, the path of an executable file, or the like. Whether these pieces of information are the same or not can be determined by, for example, using an algorithm for determining the similarity between character strings.

For example, when the respective pieces of subject information of the events being compared are the same as each other, the first alteration unit 2060 determines that the subjects of these events are the same as each other. In contrast, when the respective pieces of subject information of the events being compared are not the same as each other, the first alteration unit 2060 determines that the subjects of these event are not the same as each other.

Note, however, that the pieces of subject information for essentially the same events may differ. For example, the paths for executable files having the same contents may differ depending on the target apparatus. More specifically, the path for the executable file "fileA.exe" may be "C:¥dir1¥fileA.exe" in one target apparatus while it may be "D:¥dir2¥fileA.exe" in another target apparatus. Thus, when the subject information indicates paths of executable files, for example, the first alteration unit 2060 may determine the sameness of the events by comparing only the file names included in the paths of the executable files. Note, however, that the first alteration unit 2060 may be configured to determine that the paths of the executable files being compared represent subjects different from each other unless the paths are completely the same. In this case, even when the file names of the executable files being compared are the same as each other, these are handled as representing different subjects when the files are stored in directories different from each other.

On the Sameness of Objects

The first alteration unit 2060 determines whether the objects of a plurality of events are the same as each other by comparing the pieces of object information respectively included in the pieces of event information of the events. More specifically, the first alteration unit 2060 compares the pieces of object information of the events being compared and, when the pieces of object information are the same as each other, determines that the objects of these events are the same as each other. In contrast, when the pieces of object information are not the same as each other, the first alteration unit 2060 determines that the objects of these events are not the same as each other. Note, however, that the first alteration unit 2060 may compare only the file names when the object information indicates paths of executable files, as described above.

On the Sameness of Action Contents

The first alteration unit 2060 determines whether the action contents of a plurality of events are the same as each other by comparing the pieces of contents information respectively included in the pieces of event information of the events. More specifically, the first alteration unit 2060 compares the pieces of contents information of the events being compared and, when the pieces of contents information are the same as each other, determines that the action contents of these events are the same as each other. In contrast, when the pieces of contents information are not the same as each other, the first alteration unit 2060 determines that the action contents of these events are not the same as each other.

On the Node Operation Index Value

A node operation index value is an index value defined based on the history of operations applied to a node. For example, a node operation index value with respect to a node 12 is defined based on the number of times any operation has been applied to the node 12 by now (hereinafter referred to as the "number of times of operations on the node 12") or the frequency of operations applied to the node 12 by now (hereinafter referred to as the "frequency of operations on the node 12").

It is assumed here that a node operation index value of a node 12 is defined based on the number of times of operations on the node 12. In this case, for example, the second alteration unit 2080 defines the node operation index value as such a value that is greater when the number of times of operations on the node 12 is greater (in other words, as a value that has a positive correlation with the number of times of operations on the node 12). For example, the second alteration unit 2080 defines the node operation index value as the number of times of operations on the node 12 itself. Further, for example, the second alteration unit 2080 may define the node operation index value of a node 12 as a value obtained by inputting the number of times of operations on the node 12 to a discretionarily selected, predefined monotonically non-decreasing function. This monotonically non-decreasing function may be given in advance to the second alteration unit 2080 or may be stored in a storage device accessible from the second alteration unit 2080.

The node operation index value of a node 12 is defined based on the frequency of operations on the node 12 in a similar way. For example, the second alteration unit 2080 defines the node operation index value as such a value that is greater when the frequency of operations on the node 12 is higher (in other words, as a value that has a positive correlation with the frequency of operations on the node 12). For example, the second alteration unit 2080 defines the node operation index value as the frequency of operations on the node 12 itself. Further, for example, the second alteration unit 2080 may define the node operation index value of a node 12 as a value obtained by inputting the frequency of operations on the node 12 to a discretionarily selected, predefined monotonically non-decreasing function. This monotonically non-decreasing function may be given in advance to the second alteration unit 2080 or may be stored in a storage device accessible from the second alteration unit 2080.

Note that the frequency of operations on a node 12 is defined, for example, as the number of times any operation was applied to the node 12 in a predetermined time window or as a value obtained by dividing the number of times by the length of the time window.

The node operation index value of a node 12 does not need to be computed by using all the history of operations with respect to the node 12 but may be computed by using a part of the history of operations. For example, the node operation index value is computed by using the history of operations in a predetermined time window, for example, during the last one week. In this way, the node operation index value turns out small for a node 12 to which operations were applied frequently in the previous time but less frequently in the recent time. Conversely, the node operation index value turns out great for a node 12 to which operations were applied infrequently in the previous time but frequently in the recent time. Thus, the node operation index value serves as an index representing the interest of the user in the recent time.

Various operations can be applied to a node 12. For example, operations that can be applied to a node 12 displayed on a display device include an operation for selecting the node 12 (a tap, click, or the like). Further, for example, operations that can be applied to a node 12 displayed on a display device may include the operation of hovering the finger or mouse pointer over the node 12 for a predetermined time or longer (an operation for selecting a so-called mouseover). This predetermined time may be given in advance to the second alteration unit 2080 or may be stored in a storage device accessible from the second alteration unit 2080.

On the Edge Operation Index Value

An edge operation index value is an index value defined based on the history of operations applied to an edge 14. For example, an edge operation index value with respect to an edge 14 is defined based on the number of times any operation has been applied to the edge 14 by now (hereinafter referred to as the "number of times of operations on the edge 14") or the frequency of operations applied to the edge 14 by now (hereinafter referred to as the "frequency of operations on the edge 14").

Here, the edge operation index value of an edge 14 based on the number of times of operations on the edge 14 can be computed by using a method similar to the method of computing the node operation index value of a node 12 based on the number of times of operations on the node 12. Further, the edge operation index value of an edge 14 based on the frequency of operations on the edge 14 can be computed by using a method similar to the method of computing the node operation index value of a node 12 based on the frequency of operations on the node 12.

Note that the operations that can be applied to an edge are similar to those applied to a node.

Alteration of the Graph 10 by the First Alteration Unit 2060: S106, S108

When an event of which the event occurrence index value satisfies the first predetermined condition exists (S106: YES), the first alteration unit 2060 alters the graph 10 with respect to the edge 14 representing the event (S108). As described above, conceptually, the information processing apparatus 2000 operates in such a way as to exclude from the graph 10 an edge 14 representing an event with a large number of occurrences or a high frequency of occurrences (i.e., to remove the edge 14 from the graph 10).

Assume that the event occurrence index value is defined as a value that has a positive correlation with the number of occurrences of an event or the frequency of occurrences of an event. In this case, the condition that "the event occurrence index value is equal to or greater than the first predetermined value" is used as a first predetermined condition. In other words, the first alteration unit 2060 removes from the graph 10 an edge 14 representing an event when the event occurrence index value with respect to the event is equal to or greater than the first predetermined value. Assume, on the other hand, that the event occurrence index value is defined as a value that has a negative correlation with the number of occurrences of an event or the frequency of occurrences of an event. In this case, the condition that "the event occurrence index value is equal to or smaller than the first predetermined value" is used as a first predetermined condition. The first predetermined value may be given in advance to the first alteration unit 2060 or may be stored in a storage device accessible from the first alteration unit 2060.

Method of Removing an Edge 14 from a Graph 10

Figure 8:
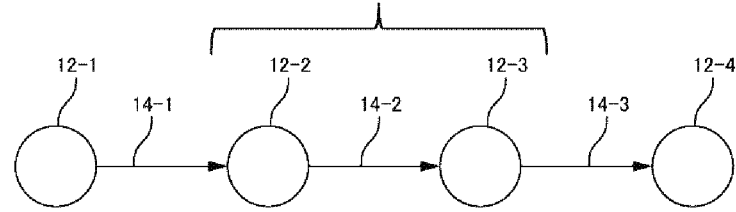
FIG. 8 is a diagram illustrating a method of removing an edge from a graph.
Figure 8:
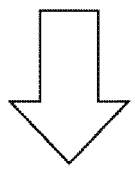
Figure 8:
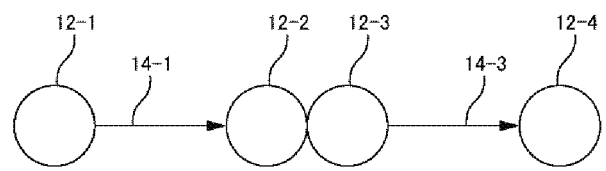
Figure 8:
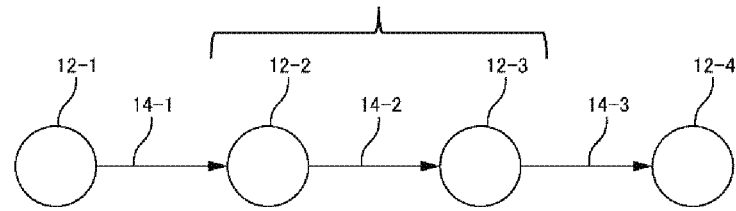
Figure 8:
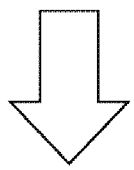
Figure 8:
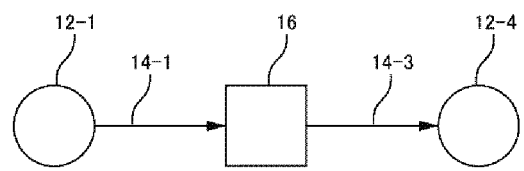

Here, a method of removing an edge 14 from a graph 10 will be described. FIG. 8 is a diagram illustrating a method of removing an edge 14 from the graph 10. In FIG. 8, it is assumed that the event occurrence index value with respect to the event represented by the edge 14-2, the node 12-2, and the node 12-3 satisfies the first predetermined condition.

In the example illustrated in the upper part of FIG. 8, the first alteration unit 2060 removes from the graph 10 only the edge 14 among the pieces of information representing the event of which the event occurrence index value satisfies the first predetermined condition. Thus, the first alteration unit 2060 removes from the graph 10 the edge 14-2, which is the edge 14 with respect to the event of which the event occurrence index value satisfies first predetermined condition, and alters the graph 10 in such a way as to couple the node 12-2 with the node 12-3 directly. By omitting the edge 14 in this way, the image size of the graph 10 can be greatly reduced when the graph 10 is drawn. Further, by omitting the information on the edge 14, the data size of the graph 10 can also be reduced.

In the example illustrated in the lower part of FIG. 8, the first alteration unit 2060 removes from the graph 10 the edge 14 and the two nodes 12 representing the event of which the event occurrence index value satisfies the first predetermined condition. Thus, not only the edge 14-2 but also the node 12-2 and the node 12-3 are removed from the graph 10. The first alteration unit 2060 provides instead an alternative representation 16 at the position from which the edge 14-1 and the like are removed. The processing in the example illustrated in the lower part of FIG. 8 can be regarded as processing for replacing the plurality of directly coupled nodes 12 in the example illustrated in FIG. 8 with one alternative representation 16.

As the alternative representation 16 is provided on the graph 10, the user who views the graph 10 can recognize that there is an omission from the graph 10 at this position. Further, since an edge 14 and a plurality of nodes 12 are replaced by one alternative representation 16, the image size of the graph 10 can be reduced when the graph 10 is drawn and the data size of the graph 10 can also be reduced. Note, however, that the edge 14-1 can be coupled with the edge 14-3 without providing an alternative representation 16 for the graph 10.

Here, assume that a plurality of adjacent edges 14 (for example, the edge 14-2 and the edge 14-3 of FIG. 8) are removed from the graph 10. In this case, the first alteration unit 2060 preferably replaces the plurality of nodes 12 respectively connected to the plurality of edges 14 as a whole with one alternative representation 16. For example, assume that, in the example illustrated in the lower part of FIG. 8, the first alteration unit 2060 removes the edge 14-2 and the edge 14-3 from the graph 10. In this case, the first alteration unit 2060 replaces three nodes 12, i.e., the node 12-2, the node 12-3, and the node 12-4 with one alternative representation 16.

Figure 9:
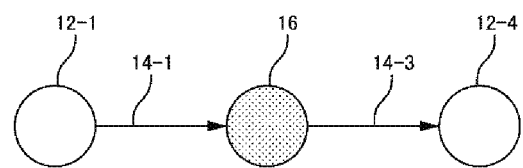
FIG. 9 is a diagram illustrating a variation of designs of alternative representation.
Figure 9:
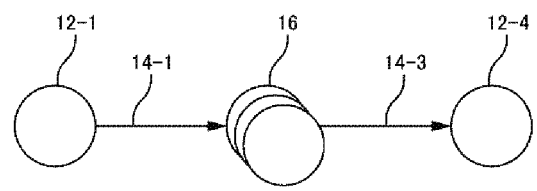

Here, the design of the alternative representation 16 (shape, color, pattern, and the like) may be any design discriminable from the design of the nodes 12. FIG. 9 is a diagram illustrating a variation of designs of alternative representation 16. In the example illustrated in the upper part of FIG. 9, the alternative representation 16 has the same shape as the nodes 12 but a different color from the nodes 12. In the example illustrated in the lower part of FIG. 9, the design of the alternative representation 16 illustrates a scene in which the nodes 12 are stacked. In this way, even a user who uses the information processing apparatus 2000 for the first time can intuitively recognize the alternative representation 16 as a replacement of a plurality of nodes 12 and an edge 14.

Restoring the Altered Graph 10 to the Original State

Figure 10:
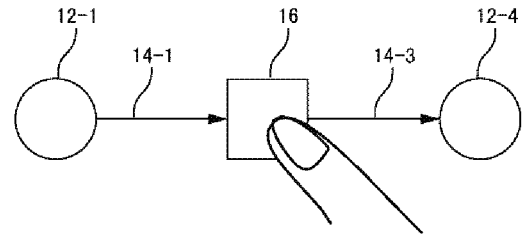
FIG. 10 is a diagram illustrating an example of an operation by a user applied to a graph of which a part has been omitted.
Figure 10:
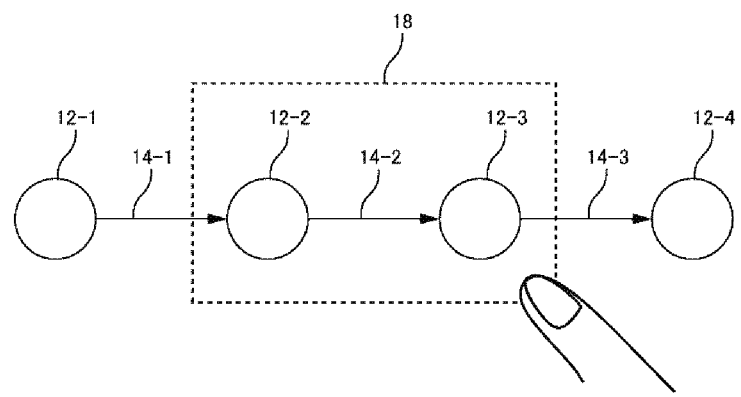
Figure 10:
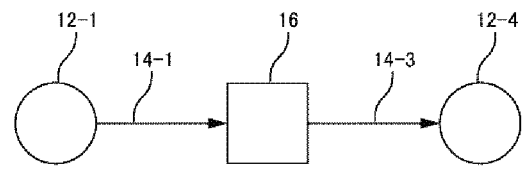

When the graph 10 has been altered as in the examples of FIG. 8, it is preferable that the graph 10 can be restored to its original state in response to an operation by the user. FIG. 10 is a diagram illustrating an example of an operation by the user applied to a graph of which a part has been omitted. It is assumed that in FIG. 10 the alternative representation 16 is a replacement of the edge 14-2 and the nodes 12-1 and 12-2 of FIG. 8.

In response to a predetermined operation applied to the alternative representation 16 by the user, the information processing apparatus 2000 presents the edge 14-2, the node 12-1, and the node 12-2 on the graph 10. In other words, the graph 10 is restored to the original state. Note, however, that in this case the information processing apparatus 2000 displays a representation 18. When the user applies a predetermined operation to this representation 18, the information processing apparatus 2000 removes the edge 14-2, the node 12-1, and the node 12-2 from the graph 10 again and displays the alternative representation 16 instead. In this way, on the graph 10, the user can easily switch between the displaying and the hiding (expansion and consolidation) of the part that can be omitted from the graph 10 (the part from which the edge 14 and the like are removed).

The predetermined operation applied to the representation 18 may be any operation. For example, the predetermined operation applied to the representation 18 is an operation of tapping or clicking on the representation 18.

Alteration of the Graph 10 Based on the Node Operation Index Value: S110, S112

When a node 12 of which the node operation index value satisfies the second predetermined condition exists, (S110: YES) the second alteration unit 2080 alters the graph 10 with respect to the node 12. As described above, conceptually, the information processing apparatus 2000 operates in such a way as to exclude from the graph 10 a node 12 with a small number of times of operations or a node 12 with a low frequency of operations.

Assume that the node operation index value is defined as a value that has a positive correlation with the number of times of operations or the frequency of operations on the node 12. In this case, the condition that "the node operation index value is equal to or smaller than the second predetermined value" is used as a second predetermined condition. In other words, the second alteration unit 2080 removes a node 12 from the graph 10 when the node operation index value with respect to the node is equal to or smaller than the second predetermined value. Assume, on the other hand, that the node operation index value is defined as a value that has a negative correlation with the number of times of operations or the frequency of operations on the node 12. In this case, the condition that "the node operation index value is equal to or greater than the second predetermined value" is used as a second predetermined condition. The second predetermined value may be given in advance to the second alteration unit 2080 or may be stored in a storage device accessible from the second alteration unit 2080.

Method of Removing a Node 12 from the Graph 10

Here, a method of removing a node 12 from the graph 10 will be described. FIG. 11 is a diagram illustrating a method of removing a node 12 from the graph 10. In FIG. 11, it is assumed that the node operation index value of the node 12-2 satisfies the second predetermined condition.

FIG. 11 illustrates three methods of removing a node 12 from the graph 10. According to the first method, the second alteration unit 2080 removes from the graph 10 only the node 12 of which the node operation index value satisfies the second predetermined condition. Thus, the second alteration unit 2080 removes the node 12-2 from the graph 10 and connects together the edge 14-2 and the edge 14-3, which were at both ends of the node 12-2.

According to the second method, the second alteration unit 2080 removes from the graph 10 not only the node 12 of which the node operation index value satisfies the second predetermined condition but also the edges 14 at both ends thereof. Thus, the second alteration unit 2080 removes from the graph 10 not only the node 12-2 but also the edge 14-2 and the edge 14-3. As a result, the node 12-1 and the node 12-3 are coupled together.

According to the third method, a plurality of nodes 12 coupled together by the second method are replaced by one alternative representation 16. Thus, the second alteration unit 2080 replaces the node 12-1 and the node 12-3 with the alternative representation 16.

As in the case of omitting an edge 14, these methods enable the reduction of the image size of the graph 10 when the graph 10 is drawn and the reduction of the data size of the graph 10.

Alteration of Graph 10 Based on the Edge Operation Index value: S114, S116

When an edge 14 of which the edge operation index value satisfies the third predetermined condition exists (S114: YES), the second alteration unit 2080 alters the graph 10 with respect to the edge 14 (S116). As described above, conceptually, the information processing apparatus 2000 excludes from the graph 10 an edge 14 with a small number of times of operations or an edge 14 with a low frequency of operations.

Assume that the edge operation index value is defined as a value that has a positive correlation with the number of times of operations or the frequency of operations on the edge 14. In this case, the condition that "the edge operation index value is equal to or smaller than the third predetermined value" is used as a third predetermined condition. In other words, the second alteration unit 2080 removes an edge 14 from the graph 10 when the node operation index value with respect to the edge 14 is equal to or smaller than the third predetermined value. Assume, on the other hand, that the edge operation index value is defined as a value that has a negative correlation with the number of times of operations or the frequency of operations on the edge 14. In this case, the condition that "the edge operation index value is equal to or greater than the third predetermined value" is used as a third predetermined condition. The third predetermined value may be given in advance to the second alteration unit 2080 or may be stored in a storage device accessible from the second alteration unit 2080.

The second alteration unit 2080 can remove an edge 14 from the graph 10 by using a method similar to the method by which the first alteration unit 2060 removes an edge 14 from the graph 10.

Outputting the Graph 10: S104, S118, S120

The output unit 2040 outputs a generated graph 10 and an altered graph 10. Here, there are various methods of outputting a graph 10. Output methods of a graph 10 will be described below.

Outputting to a Display Device

For example, the output unit 2040 outputs a graph 10 to a display device connected to the information processing apparatus 2000. In this way, the graph 10 is displayed on the display device. Note that conventional techniques can be used for displaying the graph on the display device.

Here, when a graph 10 is displayed on a display device, the size of the graph 10 can be reduced by omitting a part of nodes 12 or edges 14 by altering the graph 10, compared with the size before the omission. In other words, when the graph 10 is presented as an image, the image size can be reduced. This enables the reduction of processor resource used for the processing for generating the image representing the graph 10, the reduction of the storage region used for storing the generated image, and the reduction of the screen region of the display device used for displaying the generated image. Further, by reducing the image size of the graph 10, the graph 10 can be displayed on a display device even when the display device has a low resolution. In other words, the resolution of the display device required for displaying the graph 10 can be kept low.

Further, when the graph 10 contains fewer nodes 12 and edges 14, the user can recognize the nodes 12 and the edges 14 that are displayed more easily. Here the first alteration unit 2060 removes from the graph 10 the information on an event with a large number of occurrences or an event with a high frequency of occurrences. As described above, since events representing abnormal states occur less frequently than normal events, it can be assumed that the former has a low number of occurrences or a low frequency of occurrences. Thus, by removing from the graph 10 the information on an event with a large number of occurrences or an event with a high frequency of occurrences (in other words, an event representing a normal state), the user of the graph 10 can easily find an event that may be representing an abnormal state.

Further, the second alteration unit 2080 removes from the graph 10 the nodes 12 and the edges 14 with a small number of times of operations or a low frequency of operations. Here, as described above, the events represented by nodes 12 and edges 14 with a small number of times of operations or a low frequency of operations are the events in which the user is interested to a small extent. Thus, the information processing apparatus 2000 removes from the graph 10 the information representing such events and thereby allows the user of the graph 10 to find an event that may be representing an abnormal state.

Outputting to Another Device

The output unit 2040 may output (transmit) the graph 10 to an apparatus other than the information processing apparatus 2000. Here, reducing the number of nodes 12 and edges 14 reduces the data size of the graph 10. Thus, the processor resource and the network band width required for the transmission of the graph 10 to another apparatus can be reduced.

Outputting to a Storage Device

The output unit 2040 may output (store) the graph 10 to a storage device. As described above, reducing the number of nodes 12 and edges 14 reduces the data size of the graph 10. Thus, the storage region used for storing the graph 10 can be reduced.

Example embodiments of the present invention have been described above with reference to the drawings. These are examples of the present invention and it is possible to adopt a combination of the above-described example embodiments or various configurations other than those described above.

1. An information processing apparatus including:
a generation unit that generates a graph that represents action contents in an event relating to an action of a program as an edge and represents a subject and an object of the event as respective nodes;
an output unit that outputs the generated graph;
a first alteration unit that alters the graph with respect to an edge representing the event when an index value of the event satisfies a first predetermined condition, which index value is based on a number of occurrences or a frequency of occurrences of the event; and
a second alteration unit that executes at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge, in which
the output unit outputs the graph altered by the first alteration unit or the second alteration unit.

2. The information processing apparatus according to 1., in which
the index value of the event is computed as a value that has a positive correlation with the number of occurrences or the a frequency of occurrences of the event and the first predetermined condition is satisfied when the index value of the event is equal to or greater than a predetermined value, or
the index value of the event is computed as a value that has a negative correlation with the number of occurrences or the frequency of occurrences of the event and the first predetermined condition is satisfied when the index value of the event is equal to or smaller than a predetermined value.

3. The information processing apparatus according to 2., in which
the generation unit generates the graph with respect to a plurality of target apparatuses, and
the frequency of occurrences of the event is a number acquired by dividing a number of the target apparatuses in which the event occurred in a predetermined time window by a total number of the target apparatuses.

4. The information processing apparatus according to any one of 1. to 3., in which
the index value of the node is computed as a value that has a positive correlation with a number of times of operations or a frequency of operations applied to the node and the second predetermined condition is satisfied when the index value of the node is equal to or smaller than a predetermined value, or
the index value of the node is computed as a value that has a negative correlation with the number of times of operations or the frequency of operations applied to the node and the second predetermined condition is satisfied when the index value of the node is equal to or greater than a predetermined value.

5. The information processing apparatus according to any one of 1. to 4., in which
the index value of the edge is computed as a value that has a positive correlation with a number of times of operations or a frequency of operations applied to the edge and the third predetermined condition is satisfied when the index value of the edge is equal to or smaller than a predetermined value, or
the index value of the edge is computed as a value that has a negative correlation with the number of times of operations or the frequency of operations applied to the edge and the third predetermined condition is satisfied when the index value of the edge is equal to or greater than a predetermined value.

6. A control method that is executed by a computer, the method including:
a generation step of generating a graph that represents action contents in an event relating to an action of a program as an edge and represents a subject and an object of the event as respective nodes;
an output step of outputting the generated graph;
a first alteration step of altering the graph with respect to an edge representing the event when an index value of the event satisfies a first predetermined condition, which index value is based on a number of occurrences or a frequency of occurrences of the event; and a second alteration step of executing at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge, wherein the graph altered at the first alteration step or the second alteration step is outputted at the output step.

7. The control method according to 6., wherein the index value of the event is greater when the number of occurrences or the frequency of occurrences of the event is greater, and the first predetermined condition is satisfied when the index value of the event is equal to or greater than a predetermined value.

8. The control method according to 7., wherein at the generation step the graph is generated with respect to a plurality of target apparatuses, and the frequency of occurrences of the event is a number obtained by dividing a number of the target apparatuses in which the event occurred in a predetermined time window by a total number of the target apparatuses.

9. The control method according to any one of 6. to 8., wherein the index value of the node is greater when a number of times of operations or a frequency of operations applied to the node is greater, and the second predetermined condition is satisfied when the index value of the node is equal to or smaller than a predetermined value.

10. The control method according to any one of 6. to 9., wherein the index value of the edge is greater when a number of times of operations or a frequency of operations applied to the edge is greater, and the third predetermined condition is satisfied when the index value of the edge is equal to or smaller than a predetermined value.

11. A program that causes a computer to execute:

a generation step of generating a graph that represents action contents in an event relating to an action of a program as an edge and represents a subject and an object of the event as respective nodes;

an output step of outputting the generated graph;

a first alteration step of altering the graph with respect to an edge representing the event when an index value of the event satisfies a first predetermined condition, which index value is based on a number of occurrences or a frequency of occurrences of the event; and a second alteration step of executing at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge, wherein the graph altered at the first alteration step or the second alteration step is outputted at the output step.

12. The control method according to 11., wherein the index value of the event is greater when the number of occurrences or the frequency of occurrences of the event is greater, and the first predetermined condition is satisfied when the index value of the event is equal to or greater than a predetermined value.

13. The control method according to 12., wherein at the generation step the graph is generated with respect to a plurality of target apparatuses, and the frequency of occurrences of the event is a number obtained by dividing a number of the target apparatuses in which the event occurred in a predetermined time window by a total number of the target apparatuses.

14. The control method according to any one of 11. to 13., wherein the index value of the node is greater when a number of times of operations or a frequency of operations applied to the node is greater, and the second predetermined condition is satisfied when the index value of the node is equal to or smaller than a predetermined value.

15. The control method according to any one of 11. to 14., wherein the index value of the edge is greater when a number of times of operations or a frequency of operations applied to the edge is greater, and the third predetermined condition is satisfied when the index value of the edge is equal to or smaller than a predetermined value.

The invention claimed is:

1. An information processing apparatus comprising:
a generation unit that generates a graph that represents action contents in an event relating to an action of a program as an edge and represents a subject and an object of the event as respective nodes;
an output unit that outputs the generated graph;
a first alteration unit that alters the graph with respect to an edge representing the event when an index value of the event satisfies a first predetermined condition, which index value is based on a number of occurrences or a frequency of occurrences of the event; and
a second alteration unit that executes at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge,
wherein the output unit outputs the graph altered by the first alteration unit or the second alteration unit.

2. The information processing apparatus according to claim 1,
wherein the index value of the event is computed as a value that has a positive correlation with the number of occurrences or the frequency of occurrences of the event and the first predetermined condition is satisfied when the index value of the event is equal to or greater than a predetermined value, or
the index value of the event is computed as a value that has a negative correlation with the number of occurrences or the frequency of occurrences of the event and the first predetermined condition is satisfied when the index value of the event is equal to or smaller than a predetermined value.

3. The information processing apparatus according to claim 2,
wherein the generation unit generates the graph with respect to a plurality of target apparatuses, and
the frequency of occurrences of the event is a number acquired by dividing a number of the target apparatuses in which the event occurred in a predetermined time window by a total number of the target apparatuses.

4. The information processing apparatus according to claim 1,
wherein the index value of the node is computed as a value that has a positive correlation with a number of times of operations or a frequency of operations applied to the node and the second predetermined condition is satisfied when the index value of the node is equal to or smaller than a predetermined value, or
the index value of the node is computed as a value that has a negative correlation with the number of times of operations or the frequency of operations applied to the node and the second predetermined condition is satisfied when the index value of the node is equal to or greater than a predetermined value.

5. The information processing apparatus according to claim 1,
wherein the index value of the edge is computed as a value that has a positive correlation with a number of times of operations or a frequency of operations applied to the edge and the third predetermined condition is satisfied when the index value of the edge is equal to or smaller than a predetermined value, or
the index value of the edge is computed as a value that has a negative correlation with the number of times of operations or the frequency of operations applied to the edge and the third predetermined condition is satisfied when the index value of the edge is equal to or greater than a predetermined value.

6. A control method that is executed by a computer, the method comprising:
a generation step of generating a graph that represents action contents in an event relating to an action of a program as an edge and represents a subject and an object of the event as respective nodes;
an output step of outputting the generated graph;
a first alteration step of altering the graph with respect to an edge representing the event when an index value of the event satisfies a first predetermined condition, which index value is based on a number of occurrences or a frequency of occurrences of the event; and
a second alteration step of executing at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge,
wherein the graph altered at the first alteration step or the second alteration step is outputted at the output step.

7. A non-transitory computer readable medium storing a program that causes a computer to execute a control method, the method comprising:
a generation step of generating a graph that represents action contents in an event relating to an action of a program as an edge and represents a subject and an object of the event as respective nodes;
an output step of outputting the generated graph;
a first alteration step of altering the graph with respect to an edge representing the event when an index value of the event satisfies a first predetermined condition, which index value is based on a number of occurrences or a frequency of occurrences of the event; and
a second alteration step of executing at least one of a process of altering the graph with respect to the node when an index value of the node satisfies a second predetermined condition, which index value is based on a history of operations applied to the node, and a process of altering the graph with respect to the edge when an index value of the edge satisfies a third predetermined condition, which index value is based on a history of operations applied to the edge,
wherein the graph altered at the first alteration step or the second alteration step is outputted at the output step.

* * * * *